(12) United States Patent
Roust

(10) Patent No.: US 6,829,717 B1
(45) Date of Patent: Dec. 7, 2004

(54) METHOD AND APPARATUS FOR GENERATING TIMING INFORMATION

(75) Inventor: Robert C Roust, London (GB)

(73) Assignee: Nortel Networks Limited, St. Laurent (CA)

( * ) Notice: Subject to any disclaimer, the term of this patent is extended or adjusted under 35 U.S.C. 154(b) by 454 days.

(21) Appl. No.: 09/645,661

(22) Filed: Aug. 24, 2000

(51) Int. Cl.[7] .............................................. G06F 1/04
(52) U.S. Cl. ........................ 713/502; 713/500; 370/506
(58) Field of Search .............................. 713/400, 500, 713/501, 502, 600; 370/503, 507, 509, 506, 516; 341/50; 360/39; 375/354, 356, 363

(56) References Cited

U.S. PATENT DOCUMENTS

| | | | | | |
|---|---|---|---|---|---|
| 4,319,225 A | * | 3/1982 | Klose | .......................... | 341/51 |
| 4,381,560 A | * | 4/1983 | Farrow | ........................ | 370/204 |
| 4,667,324 A | * | 5/1987 | Graves | ........................ | 370/538 |
| 5,210,745 A | * | 5/1993 | Guinand et al. | ............ | 370/466 |
| 5,263,056 A | * | 11/1993 | Urbansky | ................... | 375/363 |
| 5,537,447 A | * | 7/1996 | Urbansky | ................... | 375/372 |

FOREIGN PATENT DOCUMENTS

EP 342010 A2 * 11/1989 ............. H04L/7/02

OTHER PUBLICATIONS

Kim et al.—"An Implementation of MPEG-2 Transport Stream Multiplexer"—Signal Processing Systems, 1999. SIPS 99. 1999 IEEE Workshop on , Oct. 20-22, 1999, Page(s): 379-389.*

* cited by examiner

*Primary Examiner*—Lynne H. Browne
*Assistant Examiner*—Thuan Du
(74) *Attorney, Agent, or Firm*—Barnes & Thornburg LLP

(57) ABSTRACT

According to telecommunication standards relating to communication networks supporting an Asynchronous Transfer Mode (ATM), timing information relating to a Constant Bit Rate (CBR) service needs to be communicated between a source network entity and a destination network entity. Typically, the timing information is obtained by measuring a phase of an incoming CBR stream of bits at the source network entity against a synchronous standard, such as a master clock signal. However, where the stream of bits comprises multiplexed services, it is difficult to measure the phase of the parts of the stream of bits relating to a service of interest without first demapping or demultiplexing the stream of bits. Consequently, the present invention overcomes this difficulty by counting justification event amongst the stream of bits, the count of justification events corresponding to timing information relating to the service of interest.

28 Claims, 7 Drawing Sheets

METHOD AND APPARATUS FOR GENERATING TIMING INFORMATION

FIELD OF THE INVENTION

The present invention relates to a method of and apparatus for generating timing information from a bit stream transmitted in a communications network, the bit stream being of the type having a constant bit rate.

BACKGROUND OF THE INVENTION

Asynchronous Transmission Mode (ATM) communication networks are packet-based networks capable of permitting communication of information between a source network entity and a destination network entity. Due to the packet nature of ATM, network resources can be shared between many users. Additionally, ATM networks can support multiplexing of a number of services, for example, voice, data or images. Typically, the source network entity transmits cells of information to the destination network entity, the destination network entity comprising a destination clock coupled to a destination buffer.

A service supported by the ATM network, for example video, can require the source network entity to receive a bit stream having a constant bit rate for transmission to the destination network entity. In such cases, proper delivery of traffic relating to the service depends upon the destination clock controlling the destination buffer being in synchronism with the frequency of the bit stream received by the source network entity. If the destination clock is not in synchronism with the bit stream received by the source network entity, information is usually lost as a result of buffer over- or under-flow. Consequently, it is necessary to generate timing information specific to the service being supported by the ATM network.

U.S. Pat. No. 5,260,978 discloses a technique for generating and transferring timing information over asynchronous communication channels by encoding a measurement of a phase of an incoming, constant bit rate, signal relative to a single master, or network, clock. The measurement of the phase, known as a synchronous Residual Time Stamp (SRTS), comprises counting a number, n, of clock cycles (of a derived network clock) having a frequency of $f_{nx}$ within a gating period determined by a number, N, of clock cycles of the incoming signal (having a frequency $f_s$) corresponding to the service. Hence, a representation (the encoded measurement) of the number of network clock cycles within a defined window surrounding an expected, or nominal, number of signal clock cycles is transmitted from the source network entity to the destination network entity using a reserved space in cell headers.

A timestamp is sampled every $T_m$ period. The following equation yields a number of cycles, n, of the network-derived clock at the frequency $f_{nx}$ in the N cycles of the incoming signal having the frequency of $f_s$:

$$n = N.Y/(X+\Phi) \quad (1)$$

Where:
X is the number cycles of the plesiochronous bits, at a nominal frequency $f_s$,
Y is a number of cycles of the network-derived clock signal running at a frequency of $f_{nx}$, and
$\Phi$ is a phase offset, in cycles, between the plesiochronous bit stream and the network-derived clock after the period $T_m$.

However, in the case of the SRTS (an ongoing count) loss of quantisation errors, and hence information, must be avoided because n constitutes the timestamp. Therefore, the SRTS is added to any previous SRTS for every timestamp period, any errors being maintained and added back in when they constitute a whole cycle (timestamp quantum).

At the destination network entity, upon receipt of the encoded measurement, the destination clock uses the encoded measurement and the signal from the network clock to reconstruct the clock cycles of the incoming signal.

It can be seen that the above described phase measurement technique requires the incoming signal. However, service signals received by the source network entity can be multiplexed within a plesiochronous frame or mapped within a synchronous container of a Synchronous Optical NETwork (SONET)/Synchronous Digital Hierarchy (SDH) frame, or both. Consequently, it may not be necessary to regenerate an incoming signal of interest before onward transmission or it may not be possible to access the service clock frequency $f_s$. Alternatively, access to the incoming signal may only be possible by first demapping or demultiplexing the incoming signal of interest; demapping or demultiplexing of the incoming signal is undesirable, because delays are introduced and system complexity is increased.

SUMMARY OF THE INVENTION

According to a first aspect of the present invention, there is provided a method of generating timing information from a stream of bits, the method comprising the steps of: receiving a master clock signal; receiving the stream of bits; identifying and counting justification events in the stream of bits over a predetermined number of bits in the stream of bits, and generating timing information in response to the count of justification events and the master clock signal.

Preferably, the stream of bits comprises a plurality of multiplexed signals corresponding to a respective plurality of services.

Preferably, the above method further comprises generating the timing information using the following equation: n=N.Y/(X+J−U), where: n is the timing information, N is the predetermined number of bits in the stream of bits, X is a number of cycles of containers holding the stream of bits over the predetermined number of bits in the stream of bits, Y is a number of cycles of the network clock, and J is a number of justification events and U is a number of used justification opportunities at nominal frequency of the stream of bits.

Preferably, the above method further comprises forming an SRTS value from a plurality of Least Significant Bits (LSBs) from the timing information. More preferably the plurality of LSBs is four LSBs.

Preferably, the above method further comprises feeding back timing information.

According to a second aspect of the present invention, there is provided a timing information generation apparatus comprising: a first input for receiving a master clock signal; a second input for receiving a stream of bits; means for identifying and counting justification events in the stream of bits over a predetermined number of bits in the stream of bits; means for generating timing information in response to the count of justification events and the master clock signal.

Preferably, the stream of bits comprises a plurality of multiplexed signals corresponding to a respective plurality of services.

Preferably, the means for generating timing information uses the following equation: n=N.Y/(X+J−U), where: n is the timing information, N is the predetermined number of bits in the stream of bits, X is a number of cycles of containers holding the stream of bits over the predetermined number of bits in the stream of bits, Y is a number of cycles of the network clock, J is a number of justification events and U is a number of used justification opportunities at a nominal frequency of the stream of bits.

Preferably, the timing generation apparatus further comprises means for forming an SRTS value from a plurality of Least Significant Bits (LSBs) from the timing information. More preferably, the plurality of LSBs is four LSBs.

According to a third aspect of the invention, there is provided a method of generation of justification events comprising the steps of: obtaining timing information from a received stream of bits; generating an initial at least one justification event; generating internal timing information in response to the initial at least one justification event; controlling the generation of subsequent justification events in response to any discrepancy between the received timing information and the internally generated timing information.

Preferably, the above method further comprises controlling the generation of subsequent justification events with a PID controller.

Preferably, any discrepancy between the received timing information and the internally generated timing information is determined using a subtractor.

According to a fourth aspect of the present invention, there is provided a justification event generation apparatus comprising: an input for receiving a stream of bits containing source timing information; means for generating an initial at least one justification event; means for generating internal timing information in response to the initial at least one justification event; controller means for the generating subsequent justification events in response to any discrepancy between the source timing information and the internally generated timing information.

Preferably, the controller means is a PID controller.

Preferably, there is provided a subtractor arranged to determine any discrepancy between the source timing information and the internally generated timing information.

According to a fifth aspect of the present invention, there is provided a communication system comprising a source network entity capable of communicating with a destination network entity via a communication network, the source network entity including a timing information generation apparatus comprising: a first input for receiving a master clock signal; a second input for receiving a stream of bits; means for identifying and counting justification events in the stream of bits over a predetermined number of bits in the stream of bits; means for generating timing information in response to the count of justification events and the master clock signal.

According to a sixth aspect of the present invention, there is provided a communication system comprising a source network entity capable of communicating with a destination network entity via a communication network, the destination network entity including justification event generation apparatus comprising: an input for receiving a stream of bits containing source timing information; means for generating an initial at least one justification event; means for generating internal timing information in response to the initial at least one justification event; controller means for the generating subsequent justification events in response to any discrepancy between the source timing information and the internally generated timing information.

According to a seventh aspect of the present invention, there is provided a computer program element comprising computer program code means to make a computer execute the method of generating timing information set forth above.

Preferably, there is provided a computer program element as set forth above in relation to the generation of timing information embodied on or in a computer readable medium.

According to an eighth aspect of the present invention, there is provided a computer program element comprising computer program code means to make a computer execute the method of generating justification events set forth above.

Preferably, there is provided a computer program element as set forth above in relation to generation of justification events embodied on or in a computer readable medium.

According to a ninth aspect of the invention, there is provided a use for a plurality of justification events in a stream of bits, wherein the plurality of justification events are counted relative to a master clock signal during a predetermined period, the counted justification events corresponding to timing information of the stream of bits.

According to a tenth aspect of the present invention, there is provided computer executable software code stored on a computer readable medium, the code being for generating timing information from a stream of bits, the code comprising: code to receive a master clock signal; code to receive the stream of bits; code to identify and count justification events in the stream of bits over a predetermined number of bits in the stream of bits, and code to generate timing information in response to the count of justification events and the master clock signal.

According to an eleventh aspect of the present invention, there is provided a programmed computer for generating a timing information from a stream of bits, comprising memory having at least one region for storing computer executable program code, and a processor for executing the program code stored in memory, wherein the program code includes: code to receive a master clock signal; code to receive the stream of bits; code to identify and countjustification events in the stream of bits over a predetermined number of bits in the stream of bits, and code to generate timing information in response to the count of justification events and the master clock signal.

According to a twelfth aspect of the present invention, there is provided a computer readable medium having computer executable software code stored thereon, the code being for generating timing information from a stream of bits and comprising: code to receive a master clock signal; code to receive the stream of bits; code to identify and count justification events in the stream of bits over a predetermined number of bits in the stream of bits, and code to generate timing information in response to the count of justification events and the master clock signal.

According to a thirteenth aspect of the present invention, there is provided a computer executable software code stored on a computer readable medium, the code being for generating justification events, the code comprising: code to obtain timing information from a received stream of bits; code to generate an initial at least one justification event; code to generate internal timing information in response to the initial at least one justification event; code to control the generation of subsequent justification events in response to any discrepancy between the received timing information and the internally generated timing information.

According to a fourteenth aspect of the present invention, there is provided a programmed computer for generating justification events, comprising memory having at least one region for storing computer executable program code, and a processor for executing the program code stored in memory, wherein the program code includes: code to obtain timing information from a received stream of bits; code to generate an initial at least one justification event; code to generate internal timing information in response to the initial at least one justification event; code to control the generation of subsequent justification events in response to any discrepancy between the received timing information and the internally generated timing information.

According to a fifteenth aspect of the present invention, there is provided a computer readable medium having computer executable software code stored thereon, the code being for generating justification events and comprising: code to obtain timing information from a received stream of bits; code to generate an initial at least one justification event; code to generate internal timing information in response to the initial at least one justification event; code to control the generation of subsequent justification events in response to any discrepancy between the received timing information and the internally generated timing information.

It is thus possible to provide a method of and apparatus for generating timing information for use in a packet based network without the need to demultiplex or demap incoming signals. The timing information can be derived without direct counting of the number of clock cycles of the incoming signal or direct generation of the derived network clock. Furthermore, the present invention is suitable for algorithmic execution and is capable of interworking with existing SRTS implementations. Consequently, the present invention is simpler and cheaper to implement.

BRIEF DESCRIPTION OF THE DRAWINGS

At least one embodiment of the invention will now be described, by way of example only, with reference to the accompanying drawings, in which.

DESCRIPTION OF A PREFERRED EMBODIMENT

Figure 1:
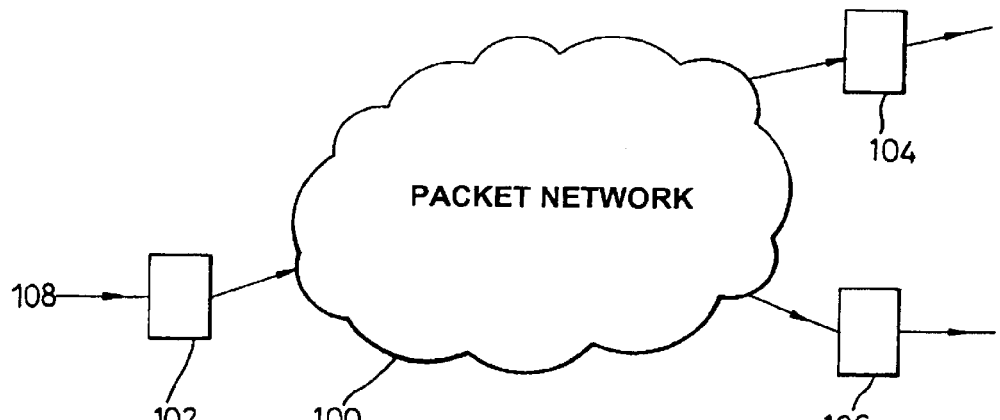
FIG. 1 is a schematic diagram of a communication network.

Throughout the following description identical reference numerals will be used to identify like parts.

Referring to FIG. 1, an ATM network 100 is supported by a SONET or an SDH network providing network synchronisation. The ATM network 100 is coupled to a source network entity 102 and a first destination network entity 104 (and a second destination network entity 106). The source network entity 102 is capable of receiving a 2 Mbps time division multiplexed incoming signal 108 from, for example, an access service provider capable of providing access to telecommunication services for a number of subscribers.

Figure 2:
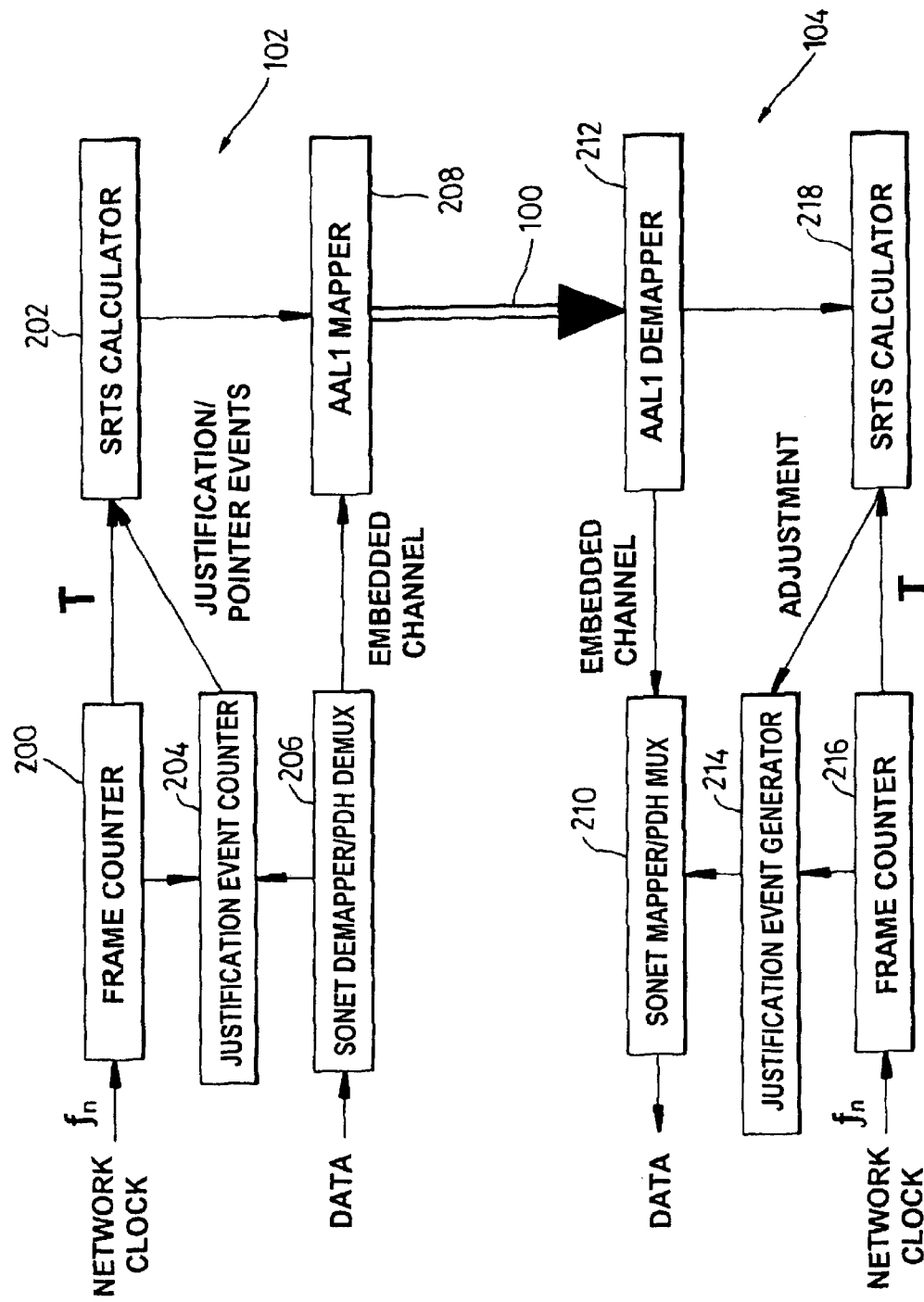
FIG. 2 is a schematic diagram of an apparatus constituting an embodiment of the invention.

Referring to FIG. 2, the source network entity 102 comprises a source frame counter unit 200 coupled to a source SRTS calculator unit 202 and a Justification Event Counter (JEC) unit 204, the JEC unit 204 also being coupled to the source SRTS calculator unit 202. A SONET demapper unit 206 is coupled to the JEC unit 204 and an ATM Adaptation Layer 1 (AAL1) mapper unit 208, the AAL1 mapper unit 208 also being coupled to the source SRTS calculator unit 202.

The first destination network entity 104 comprises a SONET mapper unit 210 coupled to an AAL1 demapper unit 212 and a Justification Event Generator (JEG) unit 214. The JEG unit 214 is coupled to a first destination frame counter unit 216 and a first destination SRTS calculator unit 218, the first destination frame counter unit 216 also being coupled to the first destination SRTS calculator unit 218.

Although reference has been made above to the SONET demapper unit 206 and the SONET mapper unit 210, it should be appreciated that the SONET demapper unit 206 and the SONET mapper unit 210 can be replaced or supplemented by a Plesiochronous Digital Hierarchy (PDH) demultiplexer and a PDH multiplexer, respectively. In relation to replacing the SONET demapper unit 206 and the SONET mapper unit 210, the PDH demultiplexer and the PDH multiplexer are referenced to a synchronous network clock.

The source SRTS calculator unit 202 (FIG. 3) comprises a first calculator input terminal 300, a second calculator input terminal 302, a third calculator input terminal 304, a fourth calculator input terminal 306 and a first calculator output terminal 308. The JEC unit 204 comprises a first JEC input terminal 310, a JEC strobe input terminal 312, and a first JEC output terminal 314, the first JEC output terminal 314 being coupled to the first calculator input terminal 300. The second calculator input terminal 302 and the third calculator input terminal 304 are coupled to a first source store 316 and a second source store 318, respectively. The fourth calculator input terminal 306 is coupled to a first output terminal 324 of a subtraction unit 322, a first input terminal 326 of the subtraction unit 322 being coupled to a third source store 320. The first input terminal 326 of the subtraction unit 322 is also coupled to a first input terminal 336 of an accumulator 332, a first output terminal 330 of the accumulator 332 being coupled to a second input terminal 328 of the subtraction unit 322 via a loop amplifier 334. A second input terminal 338 of the accumulator 332 is coupled to a first output terminal 340 of an SRTS transmission unit 342, a first input terminal 344 of the SRTS transmission unit 342 being coupled to the first calculator output terminal 308. A second input terminal 346 of the SRTS transmission unit 342 is coupled to a first output terminal 348 of a cell assembly unit 350 of the AAL1 mapper unit 208, a first input port 352 of the cell assembly unit 350 being coupled to a data output port 354 of the demapper unit 206. The demapper unit 206 comprises a justification event output terminal 356 coupled to the first JEC input terminal 310. The demapper unit 206 also comprises a second output terminal 358 coupled to the second JEC input terminal 312. The second output terminal 358 of the demapper unit 206 is also coupled to a strobe input terminal 309 of the source SRTS calculator unit 202 and a strobe input terminal 339 of the accumulator 332.

Figure 5:
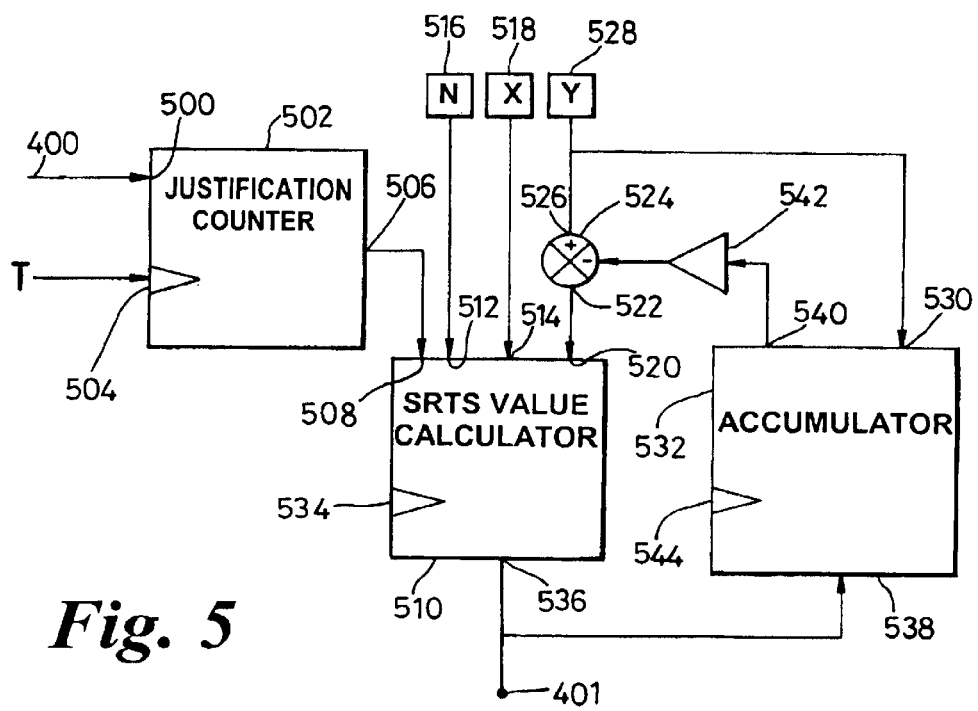
FIG. 5 is a schematic diagram of an SRTS calculator unit of FIG. 4.
Figure 3:
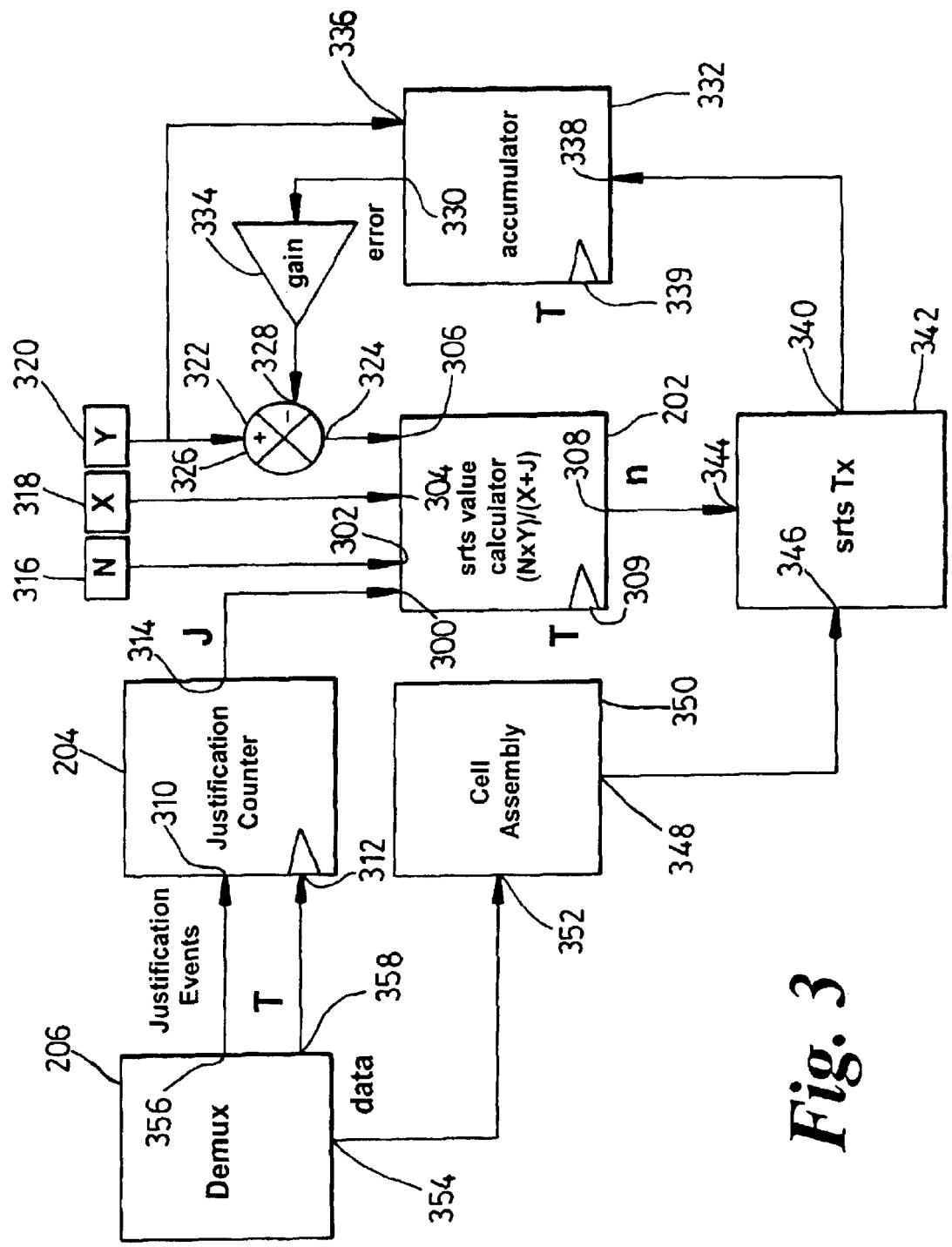
FIG. 3 is a schematic diagram showing, in more detail, a portion of the apparatus of FIG. 2.
Figure 4:
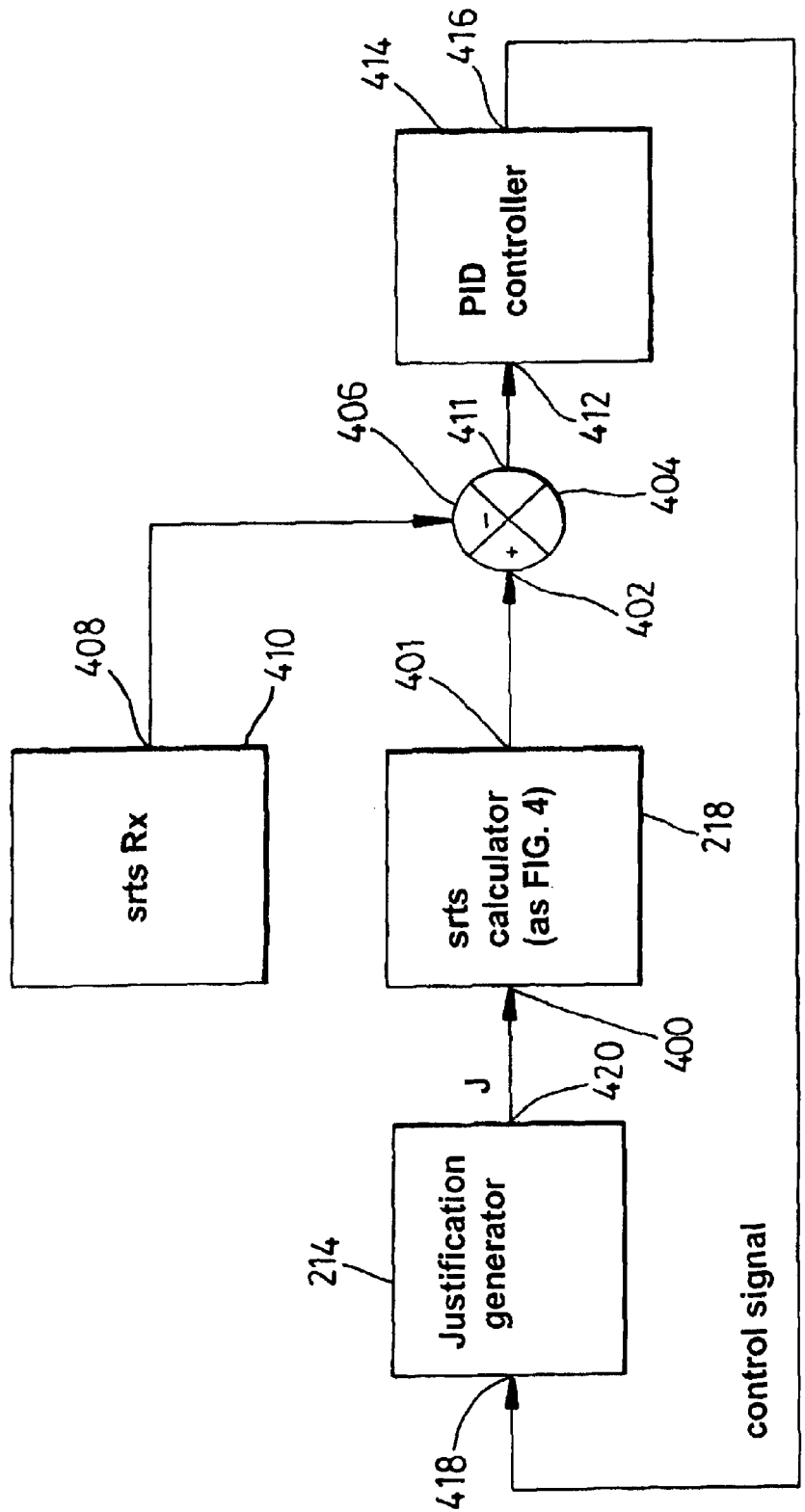
FIG. 4 is a schematic diagram, showing, in more detail, another portion of the apparatus of FIG. 2.
Figure 6:
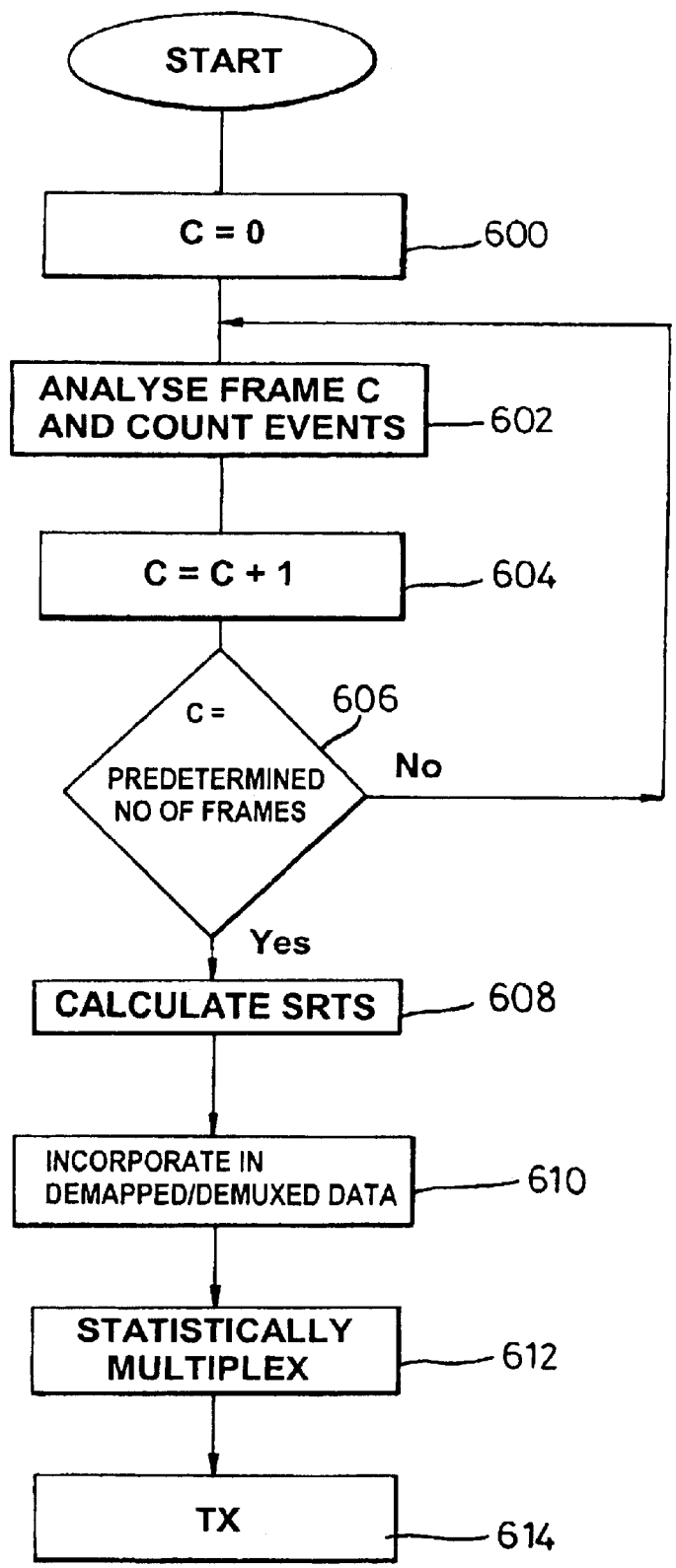
FIGS. 6 and 7 are flow diagrams of operation of the apparatus of FIG. 2.
Figure 7:
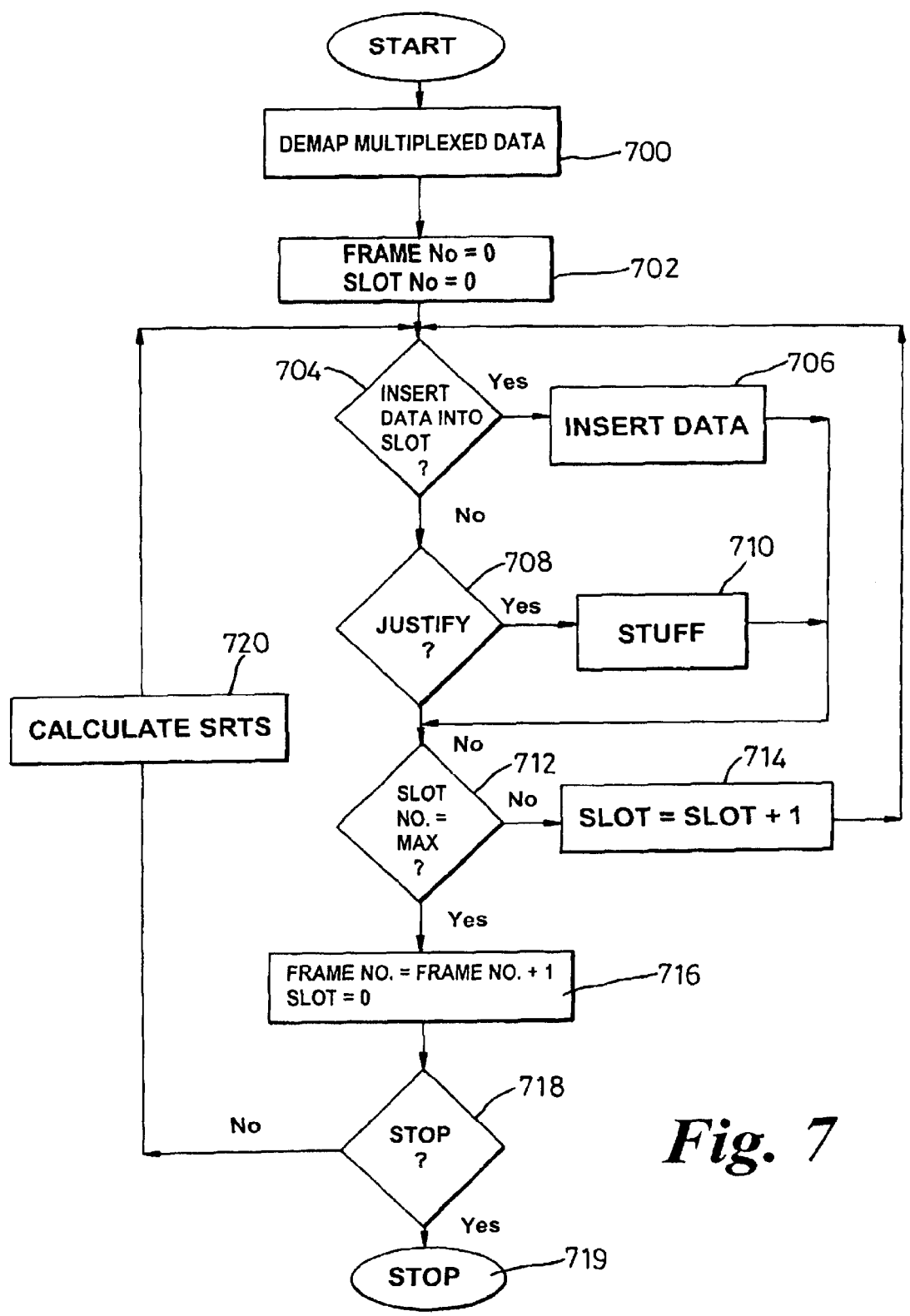

Referring to FIG. 4, the destination network entity 104 comprises the destination SRTS calculator unit 218 having a construction similar to that of the source SRTS calculator unit 202 of FIG. 3. Referring to FIG. 5, the destination SRTS calculator unit 218 comprises a destination calculator input terminal 400 and a destination calculator output terminal 401. The destination calculator input terminal 400 is coupled to a first input terminal 500 of a destination JEC unit 502. A second, strobe, input terminal 504 of the destination JEC unit 502 is coupled to a strobe signal source (not shown). An output terminal 506 of the destination JEC unit 502 is coupled to a first input terminal 508 of a destination SRTS value calculator unit 510. A second input terminal 512 and a third input terminal 514 of the destination SRTS value calculator unit 510 are coupled to a first destination store 516 and a second destination store 518, respectively. A fourth input terminal 520 of the destination SRTS value calculator unit 510 is coupled to an output terminal 522 of a destination subtractor 524, a first input terminal 526 of the destination subtractor 524 being coupled to a third destination store 528 and a first input terminal 530 of a destination accumulator 532. A fifth, strobe, input terminal 534 of the destination SRTS value calculator unit 510 is coupled to the strobe signal source (not shown). An output terminal 536 of the destination SRTS value calculator unit 510 is coupled to a second input terminal 538 of the destination accumulator 532 and the destination calculator output terminal 401. An output terminal 540 of the destination accumulator 532 is coupled to the destination subtractor 524 via a destination loop amplifier 542. A third, strobe, input terminal 544 of the destination accumulator 532 is coupled to the strobe source (not shown). The destination calculator output terminal 401 (FIG. 4) is coupled to a first input terminal 402 of a destination subtraction unit 404. A second input terminal 406 of the destination subtraction unit 404 is coupled to an SRTS receiver output terminal 408 of an SRTS receiver unit 410. A first output terminal 411 of the destination subtraction unit 404 is coupled to a first input terminal 412 of a Proportional Integral Differential (PID) controller unit 414, an output terminal 416 of the PID controller unit 414 being coupled to an input terminal 418 of the JEG unit 214. An output terminal 420 of the JEG unit 214 is coupled to the destination calculator input terminal 400.

In this example, the multiplexed incoming signal 108 is a Synchronous Digital Hierarchy (SDH) bit stream comprising a plurality of containers. Each of the plurality of containers comprises a plurality of time slots. A first number of the plurality of time slots are data slots and a second number of the plurality of time slots are non-data slots. A number of the plurality of containers comprise a respective Plesiochronous Digital Hierarchy (PDH) bit stream, the PDH bit streams being asynchronously mapped into the SDH bit stream having an SDH frequency $f_c$. When mapping the PDH bit streams into the SDH bit stream, it is necessary to employ bit-stuffing techniques in order to resolve a frequency difference that can exist between the PDH data streams and the SDH data stream. Consequently, one of the non-data slots contains overhead information in the form of justification pointers. Alternatively, one of the data slots constitutes a justification opportunity for receiving, if required, at least one stuff bit. In this case, one of the non-data slots contain information indicating whether or not the justification opportunity has been used, i.e. whether the justification opportunity (or slot) contains data or the at least one stuff bit. At a nominal frequency, i.e. a normal operating frequency defined by a telecommunications standard, a fixed ratio of the justification slots are used, for example, half. The justification pointers and stuff bits constitute justification events. Justification events are well understood in the art and so implementation and structures thereof will not be described further.

Operation of the above described apparatus will now be described, for the purposes of simplicity and clarity of description, with reference to a first of the plurality of containers corresponding to a first PDH bit stream. It should be appreciated that the following description is also applicable to other PDH bit streams borne by the number of the plurality of containers.

A count of justification events in successive occurrences of the first container provides a measure of phase difference between the PDH bit stream having a frequency $f_s$ and the SDH bit stream of frequency $f_c$. If $f_s$ and $f_c$ are nominal, a fixed ratio of justification opportunities/slots are filled with the at least one stuff bit, every extra justification opportunity above the fixed ratio filled or unfilled represents a phase advance/retard of 1 bit period referenced to $f_c$.

In the case of the SDH bit stream, the SDH container frequency, $f_c$ is related to a network clock, for example, a Stratum-1 reference derived from a Global Positioning Satellite (GPS) signal, and so the count of justification events represents a direct measure of phase of the first PDH bit stream (having the frequency $f_s$) relative to a frequency $f_n$ of the network clock.

In a more general case, for example, where the SDH bit stream is replaced by a plesiochronous bit stream, i.e. a bit stream that is not in synchronism with the network clock, it is also necessary to know a relationship, in terms of phase, between the incoming signal 108 and the network clock. Hence, in the case of the plesiochronous bit stream, a measurement of a phase of a container of the plesiochronous bit stream corresponding to the first PDH bit stream (having the container frequency $f_c$) against the network clock can be summed with the justification event count already described above to yield the phase of the first number of PDH bit streams relative to the network clock running at the frequency $f_n$.

The above described justification event count techniques can be applied through several layers of mapping and multiplexing to give the basic phase measurement required to calculate an SRTS value.

In order to generate the SRTS value, the SRTS calculator unit 202 initialises a counter c (step 600) to zero. The SRTS calculator unit 202 then analyses a $c^{th}$ SONET/SDH frame and determines (step 602) the number of justification bits in the $c^{th}$ frame. The counter c is then incremented (step 604) by one and the SRTS calculator unit 202 determines (step 606) if c is equal to a predetermined number of frames in a sample period $T_m$. If the predetermined number of frames has not been reached, i.e. the predetermined number of frames has not been analysed, the above analysis steps (steps 602 to 606) are repeated. If c is equal to the predetermined number of frames, the SRTS calculator unit 202 calculates (step 608) a timestamp value using the following equation.

$$n = N.Y/(X+(J-U)) \qquad (1)$$

Where:

n is a number of cycles of the network-derived clock at the frequency $f_{nx}$,

N is a number of cycles of the incoming signal 108 having the frequency $f_s$,

X is the number cycles of the plesiochronous bits, at a nominal frequency $f_s$, Y is a number of cycles of the network-derived clock signal running at a frequency of $f_{nx}$, and J–U corresponds to a phase offset, in cycles, between the plesiochronous bit stream and the network-derived clock after the period $T_m$, J being a number of justification events counted and U being a nominal number of used justification opportunities. Alternatively, a nominal number of unused justification opportunities can be counted.

In order to assist understanding of the above equation, the calculation of the SRTS value using equation (1) above will now be described in the context of the SDH bit stream comprising a simple synchronous mapping of T1 (a digital transmission service having a basic data rate of 1.544 Mbit/s) in Virtual Tributary (VT)1.5. It should be appreciated that other, more complex, mappings are possible but follow the same principal as will be described. For arithmetic convenience, an integer number of 8 kHz frames is used in order to yield an integer number of network-derived clock cycles and (nominal) incoming signal cycles at frequency $f_s$. Hence, the network-derived clock frequency, $f_{nx}$, is defined for $T_1$ as 2430 kHz (19.44 MHz/8) and for $f_s$ as 1544 kHz (defined by the T1 standard).

188 frames is the lowest common denominator using 8 kHz frames. In order to sample 188 frames at 8 kHz, the sample period, $T_m$ is 23.5 ms. The number of network clock cycles, Y, is 57105 and the number of cycles of the incoming signal, X, is 36284. In VT1.5 mapped T1, 2 bits are provided for justification opportunities every 500 μs multi-frame, and at the nominal frequency, exactly half the justification opportunity container slots are used. Therefore, if J is the number of live justification bits in the $T_m$ sample period, Φ in the above equation is J-47. Hence, using the equation (1) above:

$$n=3008.57105/(36284+J\text{-}47)$$

Where N is calculated on the basis of an AAL1 cell having a 47 byte payload, i.e. 47 bytes/cell×8 bits/byte×8 cells per RTS period.

A current timestamp value $TS_m$ is calculated using a preceding timestamp value $TS_{m-1}$ of a preceding sample period $T_{m-1}$ and the timestamp value of a current sample period $T_m$:

$$TS_m=TS_{m-1}+n$$

The SRTS value is effectively the four Least Significant Bits (LSBs) of an interger value of $TS_m$.

Due to the digital nature of calculations, the above equation is likely to yield non-integer values containing truncation errors for any number of bits accuracy. Additionally, the SRTS values are quantised to whole number of cycles of the network-derived clock signal prior to transmission. An accumulated value of the quatisation and truncation errors must be carried from one sample period to a subsequent sample period in order to prevent loss of phase information at the destination network entity 104. The accumulated value of the quantisation and truncation errors is handled by evaluating a current cumulative timestamp value for a sample period, $T_m$. In the above calculation, the current cumulative timestamp value for the sample period, $T_m$, should add up to Y in equation (1) (57105, in the above worked example).

In order to calculate a current timestamp value for the sample period $T_m$, the accumulator 332 subtracts the current cumulative timestamp value $TS_m$ calculated for the sample period $T_m$ from the preceding timestamp value $TS_{m-1}$ for the preceding sample period $T_{m-1}$ to yield the current timestamp value for the sample period $T_m$. The accumulator 332 then sums the current timestamp value with previous current timestamp values to yield the cumulative timestamp value.

In an error free environment, the cumulative timestamp value should add up to Y exactly. However, in the above real example, a shortfall/excess will exist due to truncation and quantisation errors. Hence, the accumulator subtracts the cumulated timestamp value from Y held in the store 320 to yield an error signal, the error signal being accumulated over previous samples to yield a cumulated error signal. The cumulated error signal is passed through the loop amplifier 334 at a gain value of, for example, 0.1 to yield a feedback component. The feedback component is subtracted from Y to yield an timestamp error value Δ. The timestamp error value Δ is added/subtracted from Y when used in equation (1) by the SRTS calculator unit 202 so as to compensate for truncation and quantisation errors, thereby ensuring that an average total of all cumulative timestamp values is equal to Y.

Subsequent to calculating (step 608) the SRTS value, the SRTS value is incorporated (step 610) into a packetised data stream and the packetised data stream, incorporating the SRTS value, is statistically multiplexed (step 612) before transmission (step 614) to the destination network entity 104.

At the first destination network entity 104, the AAL1 demapper unit 212 demaps (step 700) statistically multiplexed bits received via the packet network 100. A frame number counter and a slot number counter are both then, initially, set (step 702) to zero. In turn, each slot of each frame is analysed so as to insert data/stuffing bits. Each time slot is analysed to determine (step 704) whether data is to be inserted into the selected slot. If data is to be inserted, the data is inserted (step 706). If no data is to be inserted, the JEG unit 214 determines (step 708) whether the slot requires stuffing. If stuffing is required, stuff bits are inserted (step 710) into the selected time slot. After either data is inserted of stuffing bits are inserted or no stuffing bits are inserted into the selected time slot, the JEG unit 214 determines whether the final slot in the selected frame has been processed. If further time slots remain, the time slot counter is incremented (step 714) by one and the above described process of inserting data or stuffing bits is repeated (steps 704 to 712) for the next selected time slot. If no further time slots remain in the frame, the frame number counter is incremented (step 716) by one and the time slot counter is reset to zero. At this point, the destination network entity 104 determines (step 718) whether processing is to cease and does so (step 719) if required. Otherwise, the SRTS value is extracted (step 720) from the received bit stream and the timestamp data is derived therefrom.

Figure 8:
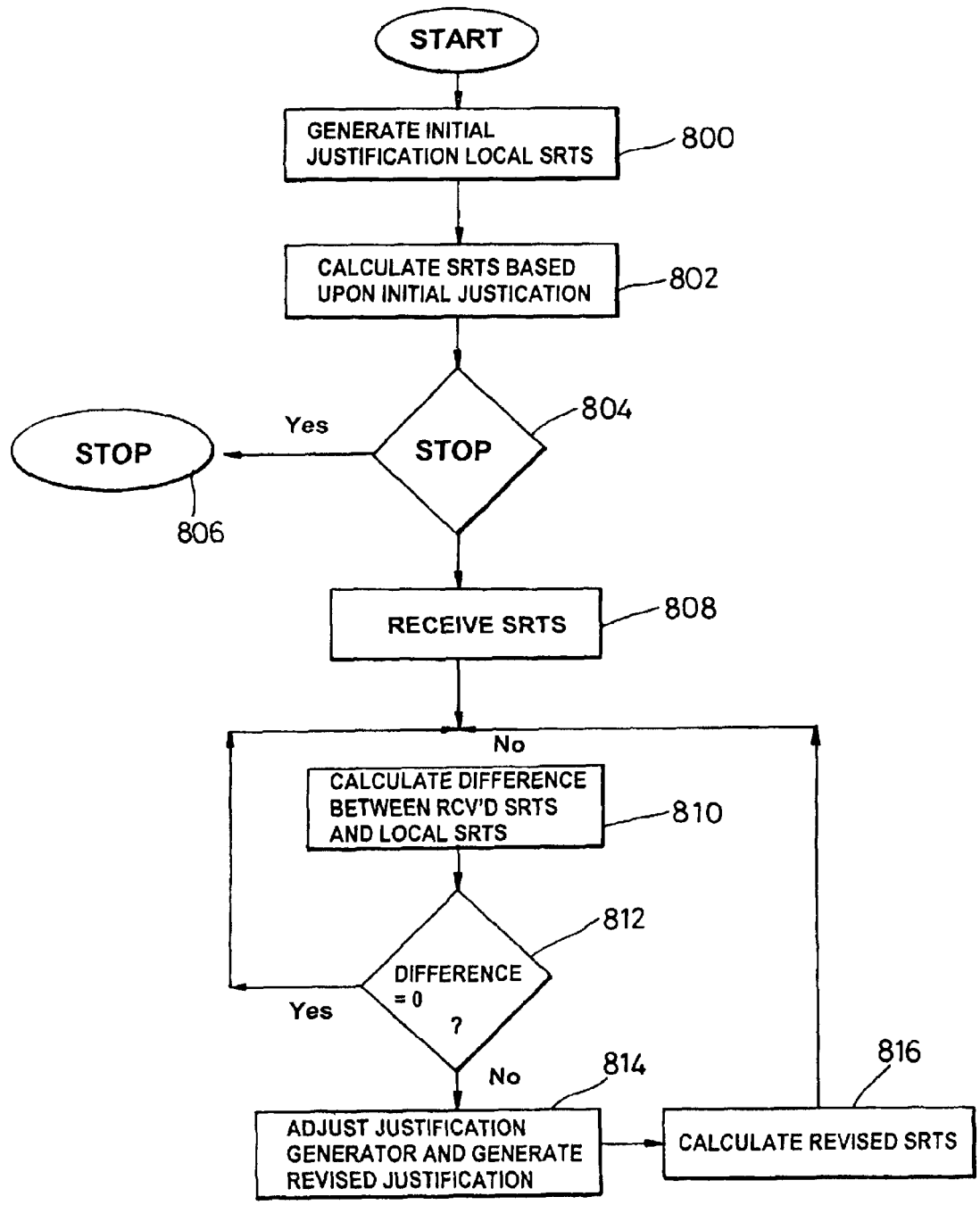
FIG. 8 is a flow diagram of the operation of another portion of the apparatus of FIG. 4.

Referring to FIG. 8, the position and quantity of justification slots is determined by the JEG unit 214 by generating (step 800) initial justification slots and calculating (step 802) an initial, internal SRTS value based upon the initial justification slots generated. At this point, the destination network entity 104 determined (step 804) whether processing is to halt. If processing is to halt, no further processing is carried out (step 806). Otherwise, a received SRTS value is obtained (step 808) from the AAL1 demapper unit 212, the SRTS calculator unit 218 calculating (step 810) a difference between the internally generated SRTS value and the received SRTS value to yield an error value. The SRTS calculator unit 218 then determines (step 812) whether the error value is zero, indicating that the internally generated SRTS value matches the received SRTS value and hence that the justification slots are correctly being assigned. If the error value is zero, no action is taken until the error value diverges from zero. If or once the error value is deemed to differ from zero, the JEG unit 214 is adjusted (step 814) by a control signal generated by the PID controller unit 414 in response to the error signal and the JEG unit 214 assigns revised justification slots. Consequently, the SRTS calculator unit 218 calculates (step 816) a revised SRTS value for use in the above error value calculation routine (steps 810 to 812).

It should be understood that in the above described example, justification by way of generating stuff bits can be replaced by generation of justification pointers.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example microwave or infrared. The series of computer instructions can constitute all or part of the functionality described above, and can also be stored in any memory device, volatile or non-volatile, such as semiconductor, magnetic, optical or other memory device.

What is claimed is:

1. A method of generating timing information from a stream of bits, comprising the steps of:
    configuring the timing information in the stream of bits with respect to a master clock signal by using justification events over a predetermined number of bits in said stream of bits to correspond to the timing information;
    generating internal timing information in response to the presence of the justification events in the stream of bits; and
    generating subsequent justification events to account for any discrepancy between the configured timing information and the generated internal timing information.

2. A method as claimed in claim 1, comprising the steps of:
    receiving the master clock signal;
    receiving the stream of bits;
    identifying and counting the justification events in the stream of bits over the predetermined number of bits in the stream of bits, and
    generating the internal timing information in response to the count of justification events and the master clock signal.

3. A method as claimed in claim 2, wherein the stream of bits comprises a plurality of multiplexed signals corresponding to a respective plurality of services.

4. A method as claimed in claim 2, further comprising generating the timing information using the following equation:

$$n=N.Y/(X+J-U),$$

where:
    n is the timing information, N is the predetermined number of bits in the stream of bits, X is a number of cycles of containers holding the stream of bits over the predetermined number of bits in the stream of bits, Y is a number of cycles of the network clock, and J is a number of justification events and U is a number of used justification opportunities at nominal frequency of the stream of bits.

5. A method as claimed in claim 2, further comprising forming an SRTS value from a plurality of Least Significant Bits (LSBs) from the timing information.

6. A method as claimed in claim 5, wherein the plurality of LSBs is four LSBs.

7. A method as claimed in claim 2, further comprising feeding back timing information.

8. A method as claimed in claim 1 wherein it includes:
    generating an initial at least one justification event for incorporation in the bit stream as received timing information;
    generating internal timing information in response to the initial at least one justification event;
    controlling the generation of subsequent justification events in response to any discrepancy between the received timing information and the internally generated timing information.

9. A method as claimed in claim 8, further comprising controlling the generation of subsequent justification events with a PID controller.

10. A method as claimed in claim 8, wherein any discrepancy between the received timing information and the internally generated timing information is determined using a subtractor.

11. A computer readable medium comprising computer program code means to make a computer execute the method of claim 1.

12. A timing information generation apparatus comprising:
    a first input for receiving a master clock signal;
    a second input for receiving a stream of bits incorporating justification events in the stream of bits over a predetermined number of bits in the stream of bits as timing information;
    means for identifying and counting the justification events in the stream of bits over a predetermined number of bits in the stream of bits;
    means for generating internal timing information in response to the count of justification events and the master clock signal; and
    means for generating subsequent justification events to account for any discrepancy between the bit stream timing information and the generated internal timing information.

13. An apparatus as claimed in claim 12, wherein the stream of bits comprises a plurality of multiplexed signals corresponding to a respective plurality of services.

14. An apparatus as claimed in claim 12 wherein the means for generating timing information uses the following equation:

$$n=N.Y/(X+J-U),$$

where:
    n is the timing information, N is the predetermined number of bits in the stream of bits, X is a number of cycles of containers holding the stream of bits over the predetermined number of bits in the stream of bits, Y is a number of cycles of the network clock, J is a number of justification events and U is a number of used justification opportunities at a nominal frequency of the stream of bits.

15. An apparatus as claimed in claim 12, wherein further comprising means for forming an SRTS value from a plurality of Least Significant Bits (LSBs) from the timing information.

16. An apparatus as claimed in claim 15, wherein the plurality of LSBs is four LSBs.

17. A communication system comprising a source network entity capable of communicating with a destination network entity via a communication network, the source network entity including a timing information generation apparatus comprising:

a first input for receiving a master clock signal;

a second input for receiving a stream of bits incorporating justification events in the stream of bits over a predetermined number of bits in the stream of bits as timing information;

means for identifying and counting the justification events in the stream of bits over as predetermined number of bits in the stream of bits;

means for generating internal timing information in response to the count of justification events and the master clock signal; and means for generating subsequent justification events to account for any discrepancy between the bit stream timing information and the generated internal timing information.

18. A method of using a plurality of justification events in a stream of bits, the method comprising the steps of:

incorporating the justification events over a predetermined number of bits in the stream of bits;

counting the plurality of justification events relative to a master clock signal during a predetermined period, the counted justification events corresponding to timing information of the stream of bits generating internal timing information in response to the presence of the justification events in the stream of bits; and generating subsequent justification events to account for any discrepancy between the bit stream timing information and the generated internal timing information.

19. Computer executable software code stored on a computer readable medium, the code being executable by a processor for generating timing information from a stream of bits, the code comprising:

code to receive a master clock signal;

code to receive the stream of bits incorporating justification events in the stream of bits over a predetermined number of bits in the stream of bits as timing information;

code to identify and count the justification events in the stream of bits over a predetermined number of bits in the stream of bits;

code to generate internal timing information in response to the count of justification events and the master clock signal; and code to generate subsequent justification events to account for any discrepancy between the bit stream timing information and the generated internal timing information.

20. A programmed computer for generating a timing information from a stream of bits, comprising memory having at least one region for storing computer executable program code, and a processor for executing the program code stored in memory, wherein the program code includes:

code to receive a master clock signal;

code to receive the stream of bits incorporating justification events in the stream of bits over a predetermined number of bits in the stream of bits as timing information;

code to identify and count the justification events in the stream of bits over a predetermined number of bits in the stream of bits;

code to generate internal timing information in response to the count of justification events and the master clock signal; and code to generate subsequent justification events to account for any discrepancy between the bit stream timing information and the generated internal timing information.

21. A computer readable medium having computer executable software code stored thereon, the code being executable by a processor for generating timing information from a stream of bits and comprising:

code to receive a master clock signal;

code to receive the stream of bits incorporating justification events in the stream of bits over a predetermined number of bits in the stream of bits as timing information;

code to identify and count the justification events in the stream of bits over a predetermined number of bits in the stream of bits;

code to generate internal timing information in response to the count of justification events and the master clock signal; and code to generate subsequent justification events to account for any discrepancy between the bit stream timing information and the generated internal timing information.

22. A justification event generation apparatus comprising:

an input for receiving a stream of bits containing source timing information;

means for generating an initial at least one justification event;

means for generating internal timing information in response to the initial at least one justification event;

controller means for controlling the generation of subsequent justification events in response to any discrepancy between the received timing information and the internally generated timing information.

23. An apparatus as claimed in claim 22, wherein the controller means is a PID controller.

24. An apparatus as claimed in claim 22, further comprising a subtractor arranged to determine any discrepancy between the source timing information and the internally generated timing information.

25. A communications system comprising a source network entity capable of communicating with a destination network entity via a communications network, the destination network entity including justification event generation apparatus comprising:

an input for receiving a stream of bits containing source timing information;

means for generating an initial at least one justification event;

means for generating internal timing information in response to the initial at least one justification event;

controller means for controlling the generation of subsequent justification events in response to any discrepancy between the received timing information and the internally generated timing information.

26. Computer executable software code stored on a computer readable medium, the code being executable by a processor for generating justification events, the code comprising:

code to obtain timing information from a received stream of bits;

code to generate an initial at least one justification event;

code to generate internal timing information in response to the initial at least one justification event;

code to control the generation of subsequent justification events in response to any discrepancy between the received timing information and the internally generated timing information.

27. A programmed computer for generating justification events, comprising memory having at least one region for storing computer executable program code and a processor for executing the program code stored in memory, wherein the code includes:

code to obtain timing information from a received stream of bits;

code to generate an initial at least one justification event;

code to generate internal timing information in response to the initial at least one justification event;

code to control the generation of subsequent justification events in response to any discrepancy between the received timing information and the internally generated timing information.

28. A computer readable medium having computer executable software code stored thereon, the code being executable by a processor for generating justification events, and comprising:

code to obtain timing information from a received stream of bits;

code to generate an initial at least one justification event;

code to generate internal timing information in response to the initial at least one justification event;

code to control the generation of subsequent justification events in response to any discrepancy between the received timing information and the internally generated timing information.

* * * * *